US012627185B2

(12) United States Patent　　　(10) Patent No.: US 12,627,185 B2
Ledieu　　　　　　　　　　　　　　　(45) Date of Patent: May 12, 2026

(54) ROTOR FOR AN ELECTRIC MOTOR PROVIDED WITH A COOLING CIRCUIT

(71) Applicant: NOVARES FRANCE, Clamart (FR)

(72) Inventor: Cédric Ledieu, Mont Saint Eloi (FR)

(73) Assignee: NOVARES FRANCE, Clamart (FR)

( * ) Notice: Subject to any disclaimer, the term of this patent is extended or adjusted under 35 U.S.C. 154(b) by 510 days.

(21) Appl. No.: 17/928,462

(22) PCT Filed: May 20, 2021

(86) PCT No.: PCT/FR2021/050921
§ 371 (c)(1),
(2) Date: May 30, 2023

(87) PCT Pub. No.: WO2021/240100
PCT Pub. Date: Dec. 2, 2021

(65) Prior Publication Data
US 2023/0307973 A1　　Sep. 28, 2023

(30) Foreign Application Priority Data
May 29, 2020　(FR) ...................................... 2005691

(51) Int. Cl.
*H02K 1/32*　　　　(2006.01)
*H02K 7/00*　　　　(2006.01)
(52) U.S. Cl.
CPC ............... *H02K 1/32* (2013.01); *H02K 7/003* (2013.01)
(58) Field of Classification Search
CPC .......... H02K 1/276; H02K 1/32; H02K 7/003; H02K 9/197
(Continued)

(56) References Cited

U.S. PATENT DOCUMENTS

| | | | |
|---|---|---|---|
| 8,970,075 B2 * | 3/2015 | Rippel | H02K 1/32 |
| | | | 310/60 A |
| 9,985,500 B2 * | 5/2018 | Rippel | H02K 5/203 |

(Continued)

FOREIGN PATENT DOCUMENTS

| | | |
|---|---|---|
| EP | 1953896 A1 | 8/2008 |
| EP | 3598611 A1 | 1/2020 |

OTHER PUBLICATIONS

International Search Report for corresponding International Application No. PCT/FR2021/050921; Date of Mailing: Oct. 4, 2021; (4 pages).

(Continued)

*Primary Examiner* — Alex W Mok
(74) *Attorney, Agent, or Firm* — CANTOR COLBURN LLP

(57) ABSTRACT

A rotor having channels for circulating a cooling fluid, a rotor shaft which is mounted for rotation about an axis, and a lamination stack which is mounted coaxially on the shaft. The lamination stack includes first internal cavities and second internal cavities which are symmetrical relative to the axis of the shaft and relative to each other. The two second internal cavities extend axially through the whole of the lamination stack so that they open, at the first end, into a front lateral face of the lamination stack and, at the other end, into a rear lateral face. The two second internal cavities are configured to allow a cooling fluid to circulate inside the lamination stack. A plurality of permanent magnets are received inside the first internal cavities. A front flange and a rear flange which are mounted coaxially on the shaft are arranged on either side of the lamination stack so as to be contiguous with the front and rear lateral faces, respectively.

18 Claims, 7 Drawing Sheets

(58) Field of Classification Search
USPC .......................................................... 310/59
See application file for complete search history.

(56) References Cited

U.S. PATENT DOCUMENTS

| 9,991,754 | B2 * | 6/2018 | Horii | H02K 1/32 |
|---|---|---|---|---|
| 10,003,223 | B2 * | 6/2018 | Friedman | H02K 5/161 |
| 10,116,178 | B2 * | 10/2018 | Horii | H02K 1/28 |
| 2009/0261667 | A1 * | 10/2009 | Matsubara | H02K 1/2766 |
| | | | | 310/54 |
| 2010/0019626 | A1 * | 1/2010 | Stout | H02K 3/50 |
| | | | | 310/214 |
| 2012/0013206 | A1 * | 1/2012 | Meyer | H02K 1/32 |
| | | | | 29/596 |
| 2015/0035393 | A1 * | 2/2015 | Rippel | H02K 9/193 |
| | | | | 310/54 |
| 2015/0280525 | A1 * | 10/2015 | Rippel | H02K 9/24 |
| | | | | 310/54 |
| 2015/0288255 | A1 * | 10/2015 | Barker | H02K 1/2781 |
| | | | | 310/43 |
| 2017/0271958 | A1 * | 9/2017 | Kitta | H02K 9/19 |
| 2019/0379250 | A1 | 12/2019 | Wakui | |
| 2020/0028395 | A1 * | 1/2020 | Hashimoto | B60K 1/00 |
| 2020/0036249 | A1 | 1/2020 | Krais et al. | |

OTHER PUBLICATIONS

English Translation for International Search Report for corresponding International Application No. PCT/FR2021/050921; Date of Mailing: Oct. 4, 2021; (2 pages).
Written Opinion of the International Searching Authority for Application No. PCT/FR/2021/050921; Dated May 29, 2020, (8 pages) (No English Translation).
EP Office Action corresponding to EP Application No. 21 733 498.6; Issue date, Mar. 31, 2025, 9 pages.

* cited by examiner

ROTOR FOR AN ELECTRIC MOTOR PROVIDED WITH A COOLING CIRCUIT

CROSS REFERENCE TO RELATED APPLICATIONS

This application is a National Stage of PCT Application No. PCT/FR2021/050921 filed on May 20, 2021, which claims priority to French Patent Application No. 20/05691 filed on May 29, 2020, the contents each of which are incorporated herein by reference thereto.

TECHNICAL FIELD

The invention concerns a rotor for an electric motor arranged to enable a better removal of the heat generated during its operation. The invention also concerns an electric motor comprising such a rotor.

BACKGROUND

In general, the current electric motors include a rotor secured to a shaft and a stator which surrounds the rotor. The stator is mounted in a casing which includes bearings for the rotational mounting of the shaft. The rotor includes a body formed by a bundle of laminations or polar wheels (claw pole) held in the form of a stack by means of a suitable fastening system. The body of the rotor includes internal cavities housing permanent magnets. The stator includes a body consisting of a bundle of laminations forming a crown, the internal face of which is provided with teeth delimiting two by two a plurality of slots open towards the inside of the stator body and intended to receive phase windings. These phase windings pass through the slots of the stator body and form winding heads projecting on either side of the stator body. The phase windings may for example consist of a plurality of U-shaped conductor segments, the free ends of two adjacent segments being connected to each other by welding.

In the rotor, the lamination stack is axially clamped between a front flange and a rear flange which are mounted coaxially with the shaft. Each flange generally has the shape of a disc extending in a radial plane perpendicular to the axis of the shaft. Each flange includes a central orifice for the coaxial mounting on the shaft and several through holes intended to receive fastening screws passing axially through the entire lamination stack, said screws being secured to the flanges by means of nuts. The front and rear flanges are generally formed of a non-magnetic, heat-conducting material, for example a metal.

The casing generally includes front and rear bearings assembled together. The bearings define an internal cavity in which the rotor and the stator are housed. Each of the bearings centrally carries a ball bearing for the rotational mounting of the shaft of the rotor.

During the operation of the motor, the current flowing through the phase windings of the stator generates significant heat that must be removed. To cool the motor, there are currently several solutions. One of these solutions is to circulate oil through the shaft of the rotor and then to circulate this oil along the stator body so that it is in contact with the winding heads of the phase windings. Such a solution, however, requires providing for numerous modifications in the structure of the motor, which makes it difficult to implement, and, therefore, relatively expensive. Another existing solution consists in providing for a cooling circuit inside the bearing with which the stator is crimped, a coolant circulating inside the cooling circuit making it possible to remove the heat generated by the stator via the bearing. However, this solution has the disadvantage of being relatively expensive and complex to implement due to the use of specific bearings incorporating an internal cooling circuit.

BRIEF SUMMARY

The invention therefore aims to provide a rotor and an electric motor comprising such a rotor arranged to enable a better removal of heat generated during its operation and does not have the disadvantages of the existing solutions described above.

To this end, the invention concerns a rotor for an electric motor comprising:

- a rotor shaft rotatably mounted about an axis;
- a lamination stack coaxially mounted on the rotor shaft, said lamination stack comprising first internal cavities and at least two second internal cavities symmetrical with respect to the axis of the shaft and to each other, said at least two second internal cavities passing axially through the entire lamination stack so that they open, at one of their ends, at a front lateral face of said lamination stack and, at another one of their ends, at a rear lateral face of said lamination stack, said at least two second internal cavities being configured to enable the circulation of a coolant inside the lamination stack;
- a plurality of permanent magnets housed inside the first internal cavities of the lamination stack;
- a front flange and a rear flange coaxially mounted on the rotor shaft and axially arranged on either side of the lamination stack so as to be contiguous respectively to the front and rear lateral faces of the lamination stack;
- characterized in that the shaft is provided with at least one first internal channel for circulating a coolant, called the inlet channel, and with at least one second internal channel for circulating a coolant, called the outlet channel, and in that the front flange, respectively the rear flange, is configured to form with the front lateral face, respectively the rear lateral face, of the lamination stack at least two front connecting channels, respectively at least two rear connecting channels, inside which a coolant can circulate, each of said at least two front, respectively rear, connecting channels, being in fluid communication with one of said inlet and outlet channels and with one of said at least two second internal cavities.

Thus configured, the rotor of the invention will make it possible to better remove the heat generated in use, due to the passage of a coolant in second internal cavities formed inside the lamination stack. Moreover, circulating the coolant through the end flanges generates few modifications in the general structure of the electric motor and, therefore, offers a relatively inexpensive solution to the problem of heat removal in electric motors.

The rotor of the invention may also include one or more of the following features:

- said at least two front connecting channels are in fluid communication with said inlet channel and said at least two rear connecting channels are in fluid communication with said outlet channel, so that a coolant intended for the cooling of the rotor can circulate in the rotor successively through the inlet channel, then between the front flange and the front lateral face of the lamination stack through said at least two front connecting channels, then inside the lamination stack through said at least two second internal cavities, then between the rear flange and the rear lateral face of the lamination stack through said at least two rear connecting channels, and finally through the outlet channel.

the shaft comprises a hollow front end portion and a hollow rear end portion separated from the front end portion by a solid central portion, the front end portion, respectively the rear end portion, being crossed by a cylindrical-shaped central cavity, said central cavity forming the inlet channel, respectively the outlet channel, of the shaft, and at least two holes radially oriented with respect to the axis of the shaft are formed inside the front end portion, respectively the rear end portion, so as to open, on one side, into the inlet channel, respectively the outlet channel, and on the other side, into said at least two front connecting channels, respectively said at least two rear connecting channels.

said at least two rear connecting channels are in fluid communication with said inlet channel and said at least two front connecting channels are in fluid communication with said outlet channel, so that a coolant intended for the cooling of the rotor can circulate in the rotor successively through the inlet channel, then between the rear flange and the rear lateral face of the lamination stack through said at least two rear connecting channels, then inside the lamination stack through said at least two second internal cavities, then between the front flange and the front lateral face through said at least two front connecting channels, and finally through the outlet channel.

the shaft comprises a hollow front end portion and a solid rear end portion separated from the front end portion by a hollow central portion, the front end portion and the central portion being crossed by a cylindrical-shaped central cavity, said central cavity forming the inlet channel of the shaft, the front end portion also being crossed by at least one peripheral cavity coaxially aligned with the central cavity, said at least one peripheral cavity forming the outlet channel of the shaft, and at least two holes radially oriented with respect to the axis of the shaft are formed inside the front end portion, respectively the central portion, so as to open, on one side, into the outlet channel, respectively the inlet channel, and on the other side, into said at least two front connecting channels, respectively said at least two rear connecting channels.

the shaft comprises a main body provided with a blind hole aligned along the axis of the shaft, said blind hole comprising two contiguous sections with different internal diameters, namely a first section having a first internal diameter and a second section having a second internal diameter, and an insert made of plastic material is housed inside the blind hole at the first section, said insert being formed of a tubular part aligned with the second section of the blind hole and having an internal diameter which is substantially equal to the second internal diameter, and of an annular part extending radially about one of the ends of the tubular part, said annular part being positioned at the interface between the first section and the second section of the blind hole and having an external diameter which is substantially equal to the first internal diameter, the inlet channel of the shaft being jointly defined by the tubular part of the insert and by the second section of the blind hole and the outlet channel of the shaft corresponding to the space delimited by the first section of the blind hole and by the tubular and annular parts of the insert.

the insert comprises one or several separation fins extending radially from the external periphery of the tubular part, each of the separation fins being configured to separate the outlet channel into two or several segments of outlet channels.

each of the front and rear flanges has an internal face in contact with a lateral face of the lamination stack, said internal face being provided with at least two oblong-shaped grooves extending radially from a recessed central region of said flange, at which said grooves are in fluid communication with the inlet or outlet channel of the shaft, to an intermediate region of said flange facing one of said at least two second internal cavities of the lamination stack.

each of said radial grooves faces a radial hole formed through the shaft, said radial hole opening, on one side, onto the inlet or outlet channel of the shaft and, on the other side, onto the peripheral wall of the shaft.

each of the front and rear flanges is provided on its internal face with a circular groove intended to house a ring-shaped gasket, said gasket being intended to provide sealing between the flange and the lamination stack.

the front flange, respectively the rear flange, is configured to form with the front lateral face, respectively the rear lateral face, of the lamination stack several groups of front connecting channels, respectively several groups of rear connecting channels, each of the groups including at least two front connecting channels, respectively at least two rear connecting channels, inside which a coolant can circulate, each of said at least two front, respectively rear, connecting channels being in fluid communication with one of said inlet and outlet channels and with one of said at least two second internal cavities.

the front flange, respectively the rear flange, is configured to form with the front lateral face, respectively the rear lateral face, of the lamination stack several front intermediate channels, respectively several rear intermediate channels, inside which a coolant can circulate, each of the front, respectively rear, intermediate channels being axially aligned with a radial segment of the lamination stack separating two adjacent second internal cavities, each of said front, respectively rear, intermediate channels being in fluid communication with one of said inlet and outlet channels and with a through hole formed through the lamination stack, said through hole may possibly receive a fastening screw intended to fasten the front and rear flanges to the lamination stack.

The invention also concerns an electric motor comprising a rotor as previously defined.

BRIEF DESCRIPTION OF THE DRAWINGS

The invention will be better understood upon reading the non-limiting following description, made with reference to the appended figures.

DETAILED DESCRIPTION

Throughout the entire description and in the claims, the terms "axial" and "radial" and their derivatives are defined with respect to the axis of rotation of the rotor. Thus, an axial orientation relates to an orientation parallel to the axis of rotation of the rotor and a radial orientation relates to an orientation perpendicular to the axis of rotation of the rotor. Moreover, by convention, the terms "front" and "rear" refer to separate positions along the axis of rotation of the rotor. In particular, the "front" end of the shaft of the rotor corresponds to the shaft end on which a pulley, a pinion, a spline intended to transmit the rotational movement of the rotor to any other similar movement transmission device can be fastened.

Figure 1:
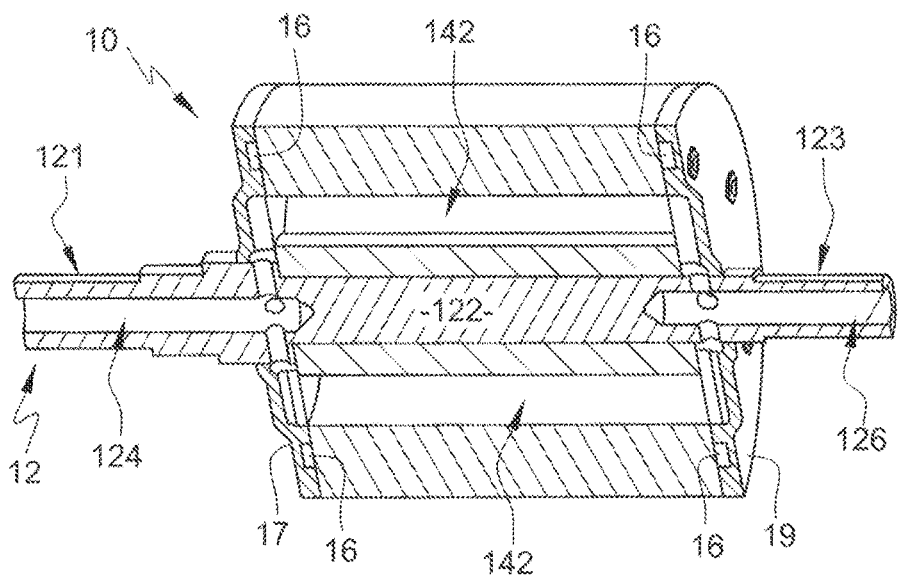
FIG. 1 is a truncated perspective view of a rotor according to a first embodiment of the invention.
Figure 2:
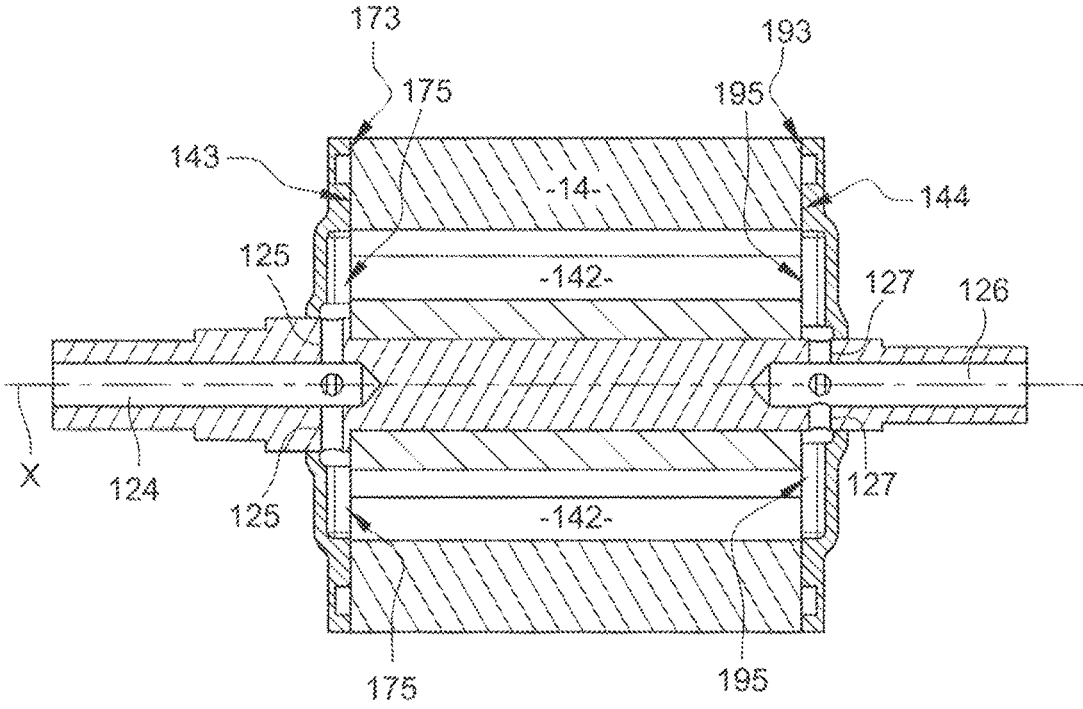
FIG. 2 is a longitudinal sectional view of the rotor according to FIG. 1.
Figure 3:
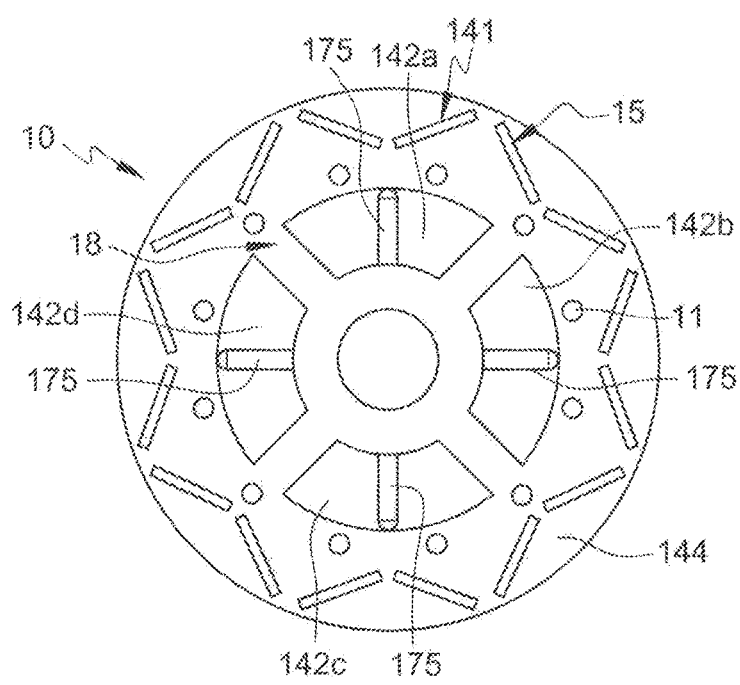
FIG. 3 is a rear axial view of the rotor according to FIG. 1, the rear flange having been removed.

FIGS. 1 to 3 show a rotor 10 according to a first embodiment of the invention. The rotor 10 comprises a substantially cylindrical body formed by a lamination stack 14 made of a ferromagnetic material, in particular steel, said body being secured in rotation with a shaft 12 rotatably mounted about an axis X. The rotor 10 further comprises a plurality of permanent magnets 15 intended to be housed in a plurality of first internal cavities 141 formed inside the lamination stack 14 and disposed obliquely to each other, each of the first internal cavities 141 housing a single permanent magnet 15. The magnets 15 may consist for example of rare earth. In the shown embodiment, the magnets 15 have the shape of a parallelepiped with a rectangular section and are aligned in two planes perpendicular to the axis X of the shaft 12, each of said planes respectively forming a front lateral face 143 and a rear lateral face 144 of the lamination stack 14. The magnets 15 are uniformly distributed about the axis X and are disposed to form a multi-arm star pattern. The lamination stack 14 is coaxially mounted on the shaft 12. The shaft 12 may be fitted by force inside a central aperture of the lamination stack 14 so as to link in rotation the body of the rotor with the shaft 12.

The lamination stack 14 is formed by an axial pile of laminations which extends in a radial plane perpendicular to the axis X of the shaft 12. A plurality of fastening holes 11 are made in the lamination stack 14 to enable the passage of screws (not shown) for fastening the laminations of the stack. These fastening holes 11 are through holes so that it is possible to push a screw inside each hole 11. A first end of the screws bears against the external face of a front end flange 17, while the other end of the screws protrudes from the external face of a rear end flange 19 and is threaded so as to receive a nut which, once screwed, exerts a pressure against said external face. Thus, the lamination stack 14 is axially clamped between the front end flange 17 and the rear end flange 19. These flanges 17, 19 may advantageously make it possible to ensure a balancing of the rotor 10 while allowing a good maintenance of the magnets 15 inside the first internal cavities 141. The balancing of these flanges can be carried out by adding or removing material. The removal of material can be carried out by machining, while the addition of material can be carried out by implanting elements in apertures provided for this purpose and distributed along the circumference of the flanges 17, 19.

As illustrated in FIG. 3, the lamination stack 14 moreover comprises a plurality of second internal cavities 142 extending in a radial direction with respect to the axis X and which are axially through. These second internal cavities 142 are configured to enable the circulation of a coolant inside the lamination stack. In the shown embodiment, the number of these second internal cavities 142 is four, namely the cavities 142a, 142b, 142c and 142d. The cavities 142a-142d each have a ring portion-shaped section and are uniformly distributed about the axis X. Two directly adjacent cavities 142a-142d are separated by a radial segment 18 of the lamination stack 14 so that a central annular part of the body of the rotor consists of alternating second internal cavities 142a-142d and radial segments 18. As shown in FIG. 2, each cavity 142a-142d opens, at one of its ends, at the front lateral face 143 of said lamination stack 14, and, at another one of its ends, at the rear lateral face 144 of said lamination stack 14. Each of the front and rear lateral faces 143, 144 faces and is directly adjacent to an internal face 173, 193 respectively of the front and rear flanges 17, 19.

Figure 4:
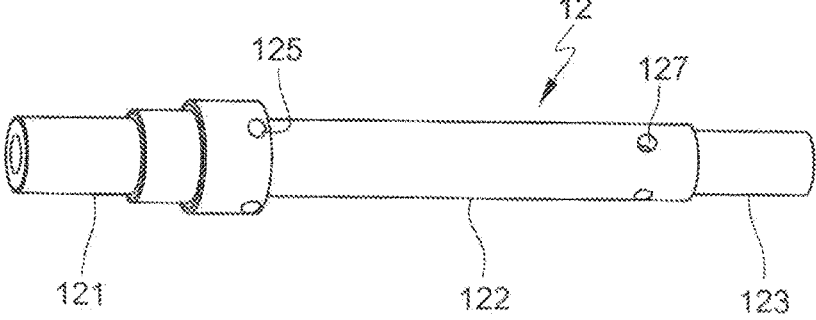
FIG. 4 is a perspective view of the shaft used in the rotor of FIG. 1.
Figure 5:
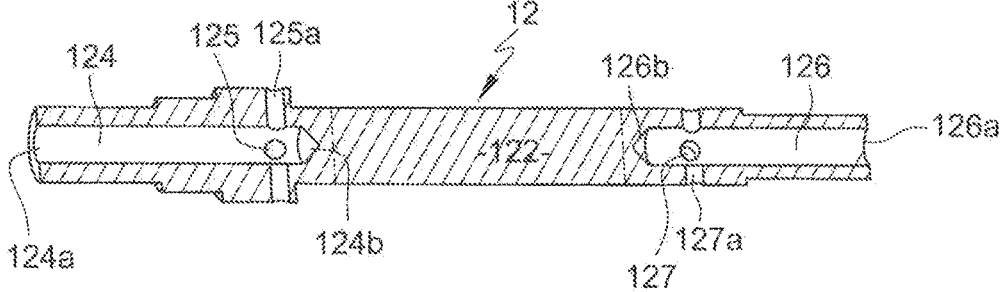
FIG. 5 is a longitudinal sectional view of the shaft of FIG. 4.

Referring to FIGS. 4 and 5, the shaft 12 fitted to the rotor of FIG. 1 is shown. This shaft 12 comprises in particular a hollow front end portion 121 and a hollow rear end portion 123 separated from the front end portion 121 by a solid central portion 122 (the central portion 122 is delimited by dotted lines in FIG. 5). The front end portion 121 is crossed by a cylindrical-shaped central cavity 124, said cavity having a front end 124a open towards the outside and a closed rear end 124b. Near the rear end 124b, a series of four holes 125 radially oriented with respect to the axis X of the shaft 12 is formed, said holes 125 being disposed at right angles to each other. Each of the holes 125 has an end 125a radially distant from the central cavity 124 and open towards the outside. The front end portion 121 is thus configured to enable the inlet of a coolant flow at the front end 124a of the central cavity 124, then the circulation of said coolant through the central cavity 124 until reaching the radial holes 125, then through the radial holes 125 until reaching the ends 125a of the holes 125. Symmetrically, the rear end portion 123 is crossed by a cylindrical-shaped central cavity 126, said cavity having a rear end 126a open towards the outside and a closed front end 126b. Near the front end 126b, a series of four holes 127 radially oriented with respect to the axis X of the shaft 12 is formed, said holes 127 being disposed at right angles to each other. Each of the holes 127 has an end 127a radially distant from the central cavity 126 and open towards the outside. The rear end portion 123 is thus configured to enable the inlet of a coolant flow at the ends 127a of the radial holes 127, then the circulation of said coolant through the radial holes 127 until reaching the central cavity 126, then through the central cavity 126 until reaching the rear end 126*a* of the central cavity 126.

In the following description, and by convention, the central cavity 124 will thus be called the coolant inlet channel and the central cavity 126 will be called the coolant outlet channel.

Figure 6:
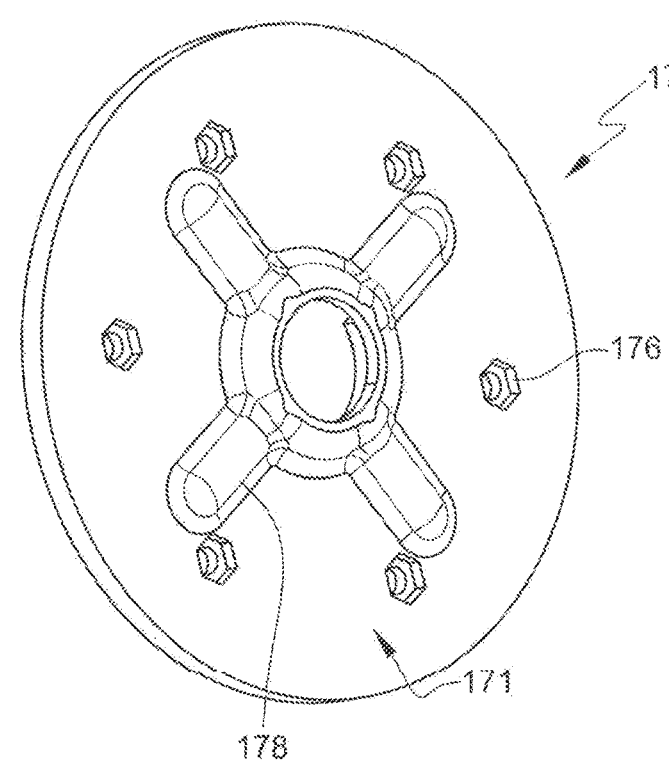
FIG. 6 is a perspective view of the external face of the front flange used in the rotor of FIG. 1.
Figure 7:
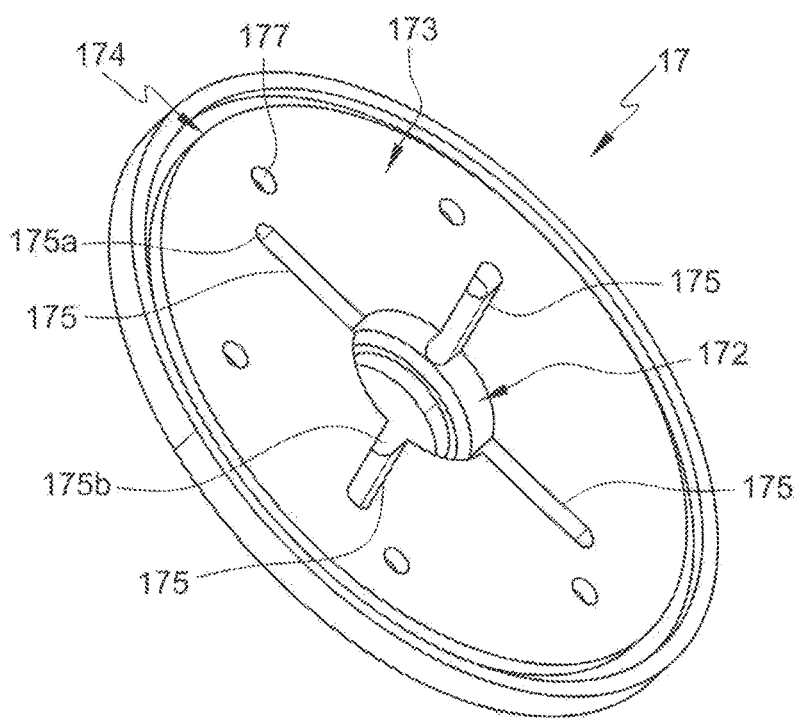
FIG. 7 is a perspective view of the internal face of the flange of FIG. 6.

Referring to FIGS. 6 and 7, the front flange 17 fitted to the rotor 10 of FIG. 1 is shown. The rear flange 19 having a structure identical to the front flange 17, the technical details given below will similarly apply to the rear flange 19. The front flange 17 is substantially in the form of a disc comprising in particular an external face 171 and an internal face 173. The internal face 173 is in contact with the front lateral face 143 of the lamination stack 14 (the internal face 193 of the rear flange 19 is however in contact with the rear lateral face 144 of the lamination stack 14). The internal face 173 is provided with a series of four oblong-shaped grooves 175 extending radially from a recessed central region 172 of said flange to an intermediate region of said flange, the four grooves 175 being disposed at right angles to each other. The external face 171 therefore has a protrusion 178 conforming to the hollow shape of the underlying grooves 175. Cavities 176 with hexagonal section are moreover provided at the external face 171, each of said cavities 176 being adapted to house the head of a screw intended to connect the front and rear flanges 17, 19. A bore 177 is therefore formed through the front flange 17 to enable the passage of the threaded rod of said screw.

As illustrated in FIG. 7, each of the grooves 175 has a distal end 175*a* and a proximal end 175*b*. In the mounted position of the front flange 17 shown in FIG. 1, the proximal end 175*b* opens onto the central region 172 towards which the ends 125*a* of the radial holes 125 of the shaft 12 also open and the distal end 175*a* faces one of the second internal cavities 142*a*-142*d* of the lamination stack 14. Thus, a fluid communication takes place between the radial holes 125 of the shaft 12 and the second internal cavities 142*a*-142*d* via the grooves 175 of the front flange 17. Similarly, a fluid communication takes place between the radial holes 127 of the shaft 12 and the second internal cavities 142*a*-142*d* via radial grooves 195 formed at the internal face 193 of the rear flange 19.

In the following description, and by convention, the grooves 175 will thus be called front connecting channels and the grooves 195 will be called rear connecting channels.

Thus configured, the rotor 10 may be cooled by a coolant, such as for example oil, said coolant circulating in the rotor successively through the inlet channel 124, then between the front flange 17 and the front lateral face 143 of the lamination stack 14 through the front connecting channels 175, then inside the lamination stack 14 through the second internal cavities 142*a*-142*d*, then between the rear flange 19 and the rear lateral face 144 of the lamination stack 14 through the rear connecting channels 195, and finally through outlet channel 126.

As shown in FIGS. 1 and 7, each of the front and rear flanges 17, 19 is advantageously provided on its internal face 173, 193 with a circular groove 174 intended to house a ring-shaped gasket 16, said gasket 16 being intended to provide sealing between the front or rear flange 17, 19 and the lamination stack 14. For this purpose, the circular groove 174 will be radially farther from the central region 172 than the distal ends 175*a* of the grooves 175.

Figure 8:
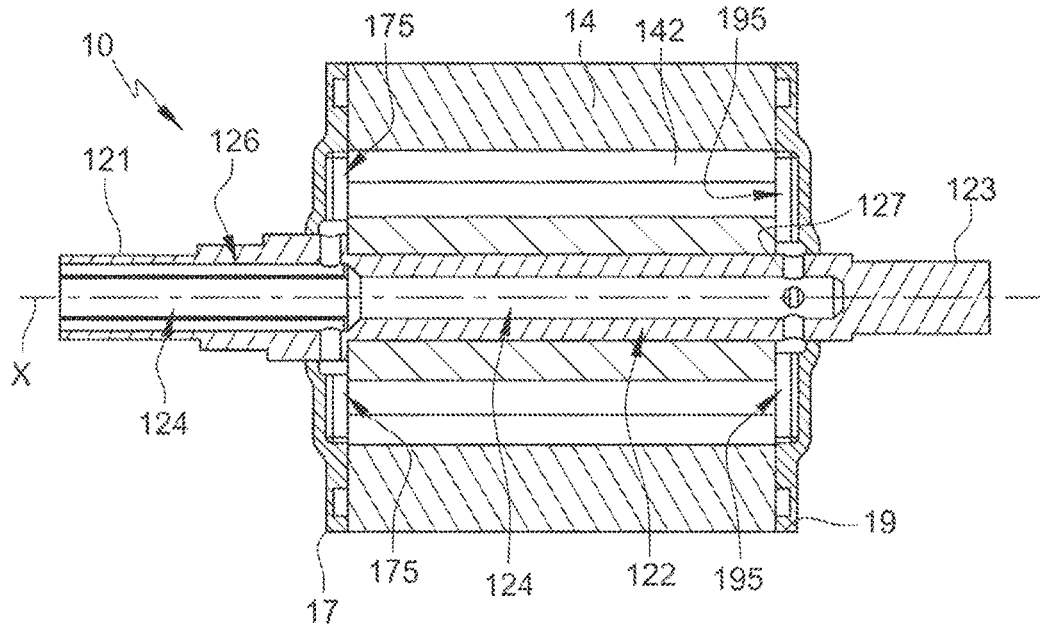
FIG. 8 is a longitudinal sectional view of a rotor according to a second embodiment of the invention.

FIG. 8 shows a rotor 10 according to a second embodiment of the invention. This second embodiment differs from the first embodiment previously described by the shaft 12 used, which induces an also different cooling circuit.

Figure 10:
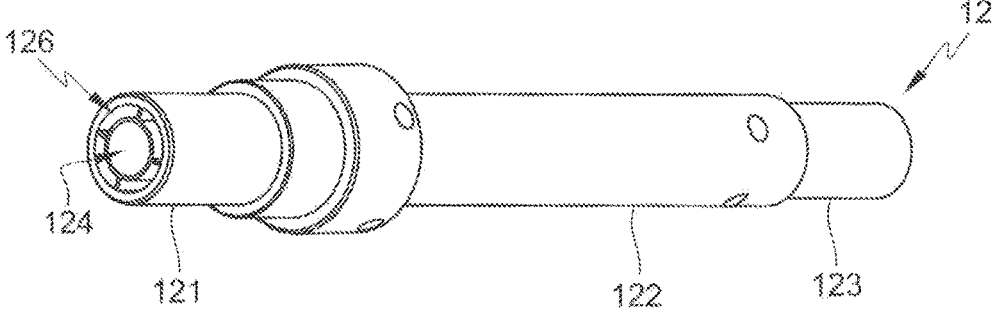
FIG. 10 is a perspective view of the shaft used in the rotor of FIG. 8.
Figure 11:
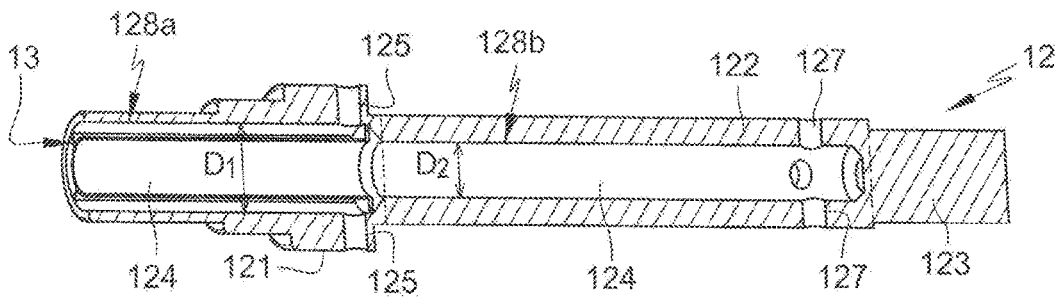
FIG. 11 is a longitudinal sectional view of the shaft of FIG. 10.
Figure 12:
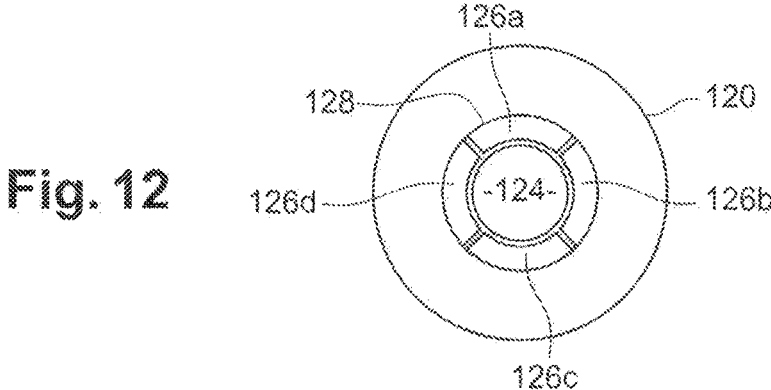
FIG. 12 is a front axial view of the shaft of FIG. 10.
Figure 13:
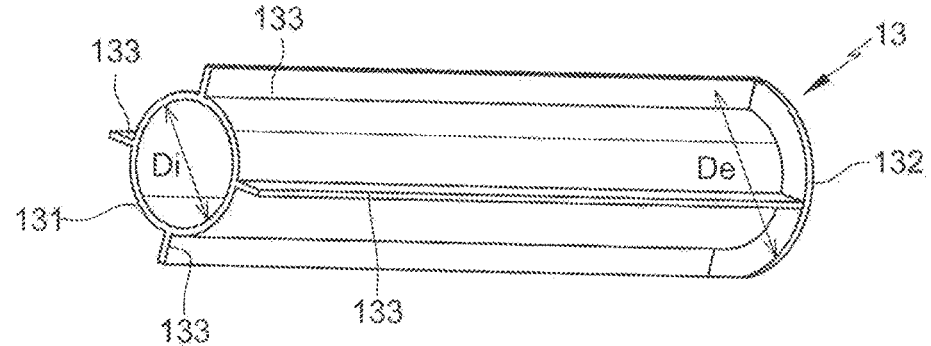
FIG. 13 is a perspective view of the insert used in the shaft of FIG. 10.

In particular, as shown in FIGS. 10 to 12, the shaft 12 comprises a main body 120, formed of a front end portion 121 and a rear end portion 123, said end portions being separated by a central portion 122 (the central portion 122 is delimited by dotted lines in FIG. 11). The main body 120 is provided with a blind hole 128 aligned along the axis X of the shaft 12. This blind hole 128 comprises two contiguous sections with different internal diameters, namely a first section 128*a* having an internal diameter D1 and a second section 128*b* having an internal diameter D2. An insert 13 made of plastic material is housed inside the blind hole 128 at the first section 128*a*. As shown in FIG. 13, this insert 13 is formed of a tubular part 131, having an internal diameter Di substantially equal to the internal diameter D2, and of an annular part 132 extending radially about one of the ends of the tubular part 131, said annular part 132 having an external diameter De substantially equal to the internal diameter D1. Four fins 133 extend radially from the external periphery of the tubular part 131, said fins 133 being perpendicular to each other. Each of the fins 133 has a length such that its free end is tangent to the external peripheral edge of the annular part 132. When the insert 13 is fastened in the main body 120, its tubular part 131 is aligned with the second section 128*b* of the blind hole 128 and its annular part 132 is positioned at the interface between the first section 128*a* and the second section 128*b* of the blind hole 128. Thus configured, the shaft 12 has a first channel 124, called the inlet channel, through which a coolant intended to cool the rotor 10 can be conveyed, and at least one second channel 126, called the outlet channel, through which the coolant can exit after having stored the heat coming from the magnets 15 and the lamination stack 14. The inlet channel 124 is jointly formed by the tubular part 131 of the insert 13 and by the second section 128*b* of the blind hole 128. The outlet channel 126 is defined by the peripheral space surrounding the tubular part 131 of the insert 13. The outlet channel 126 is thus delimited by the internal wall of the first section 128*a* of the blind hole 128 and by the tubular and annular parts 131, 132 of the insert 13. This outlet channel 126 is respectively divided into four outlet channel segments 126*a*, 126*b*, 126*c* and 126*d*, two directly adjacent segments being separated by a fin 133. Moreover, the shaft 12 is provided with four holes 125 radially oriented with respect to the axis X of the shaft 12, said holes 125 being formed inside the front end portion 121 so as to open, on one side, into one of the outlet channel segments 126*a*-126*d* and, on the other side, into one of the front connecting channels 175, as shown in FIG. 8. Similarly, four holes 127 radially oriented with respect to the axis X of the shaft 12 are formed inside the central portion 122 so as to open, on one side, into the inlet channel 124 and, on the other side, into one of the rear connecting channels 195.

Thus configured, the rotor 10 may be cooled by a coolant, such as for example oil, said coolant circulating in the rotor successively through the inlet channel 124, then between the rear flange 19 and the rear lateral face 144 of the lamination stack 14 through the rear connecting channels 195, then inside the lamination stack 14 through the second internal cavities 142*a*-142*d*, then between the front flange 17 and the front lateral face 143 of the lamination stack 14 through the front connecting channels 175, and finally through the outlet channel segments 126*a*-126*d*.

Figure 9:
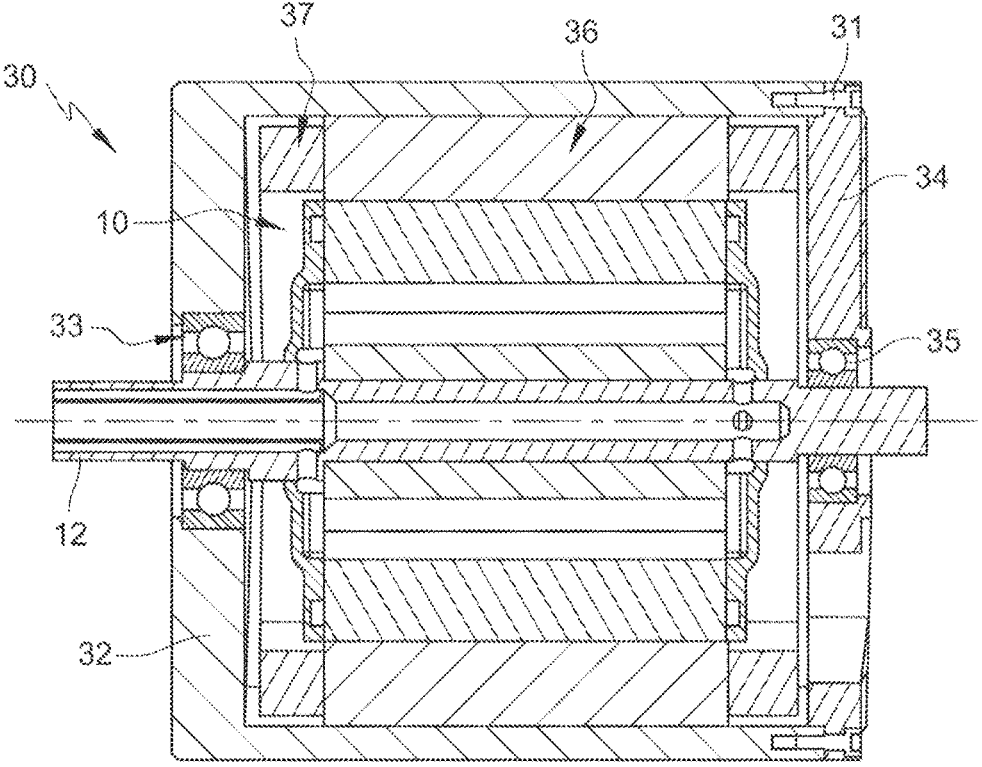
FIG. 9 is a longitudinal sectional view of an electric motor incorporating the rotor of FIG. 8.

Referring to FIG. 9, an electric motor 30 equipped with the rotor 10 of FIG. 8 is shown. This electric motor 30 comprises in particular a two-part casing housing the rotor 10 and an annular stator 36 which surrounds the rotor 10 coaxially with the shaft 12. The casing comprises in particular a front bearing 32 and a rear bearing 34 connected to each other by means of fastening screws 31. The bearings 32, 34 have a hollow shape and each centrally carries a ball bearing, respectively 33 and 35, for the rotational mounting of the shaft 12. Winding heads 37 axially project on either side of the stator body 36 and are housed in the intermediate space separating the stator 36 from the respective bearings 32, 34. The front and rear bearings 32, 34 will advantageously be made of metal.

Figure 14:
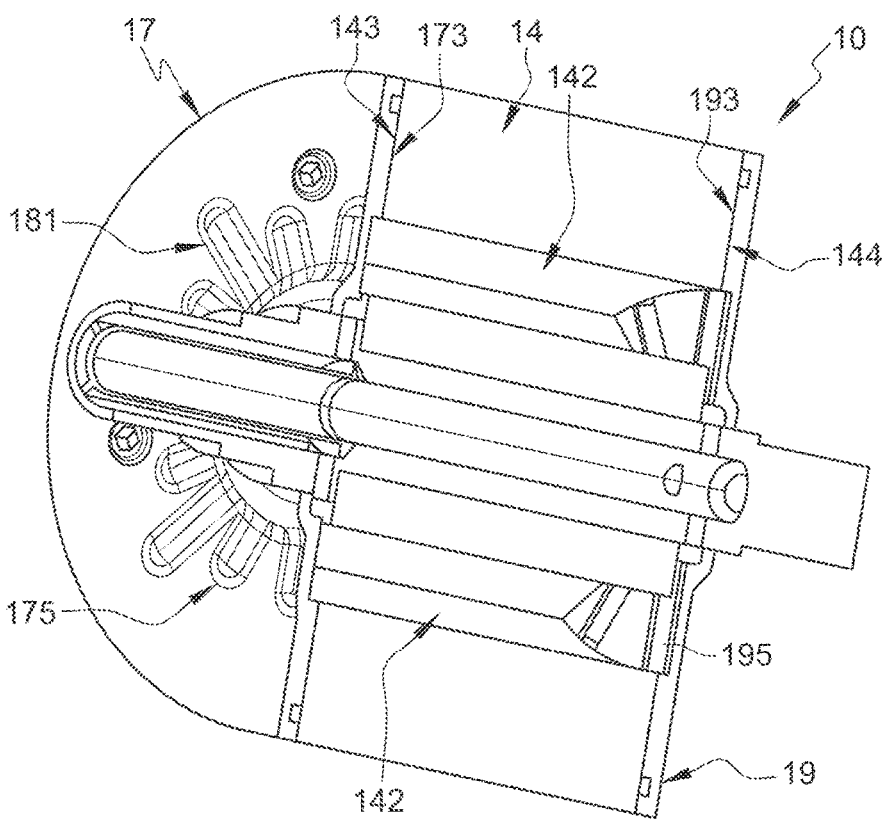
FIG. 14 is a truncated perspective view of a rotor according to a third embodiment of the invention.

FIG. 14 shows a rotor 10 according to a third embodiment of the invention. This third embodiment differs from the second embodiment by the front and rear flanges used.

Figure 15:
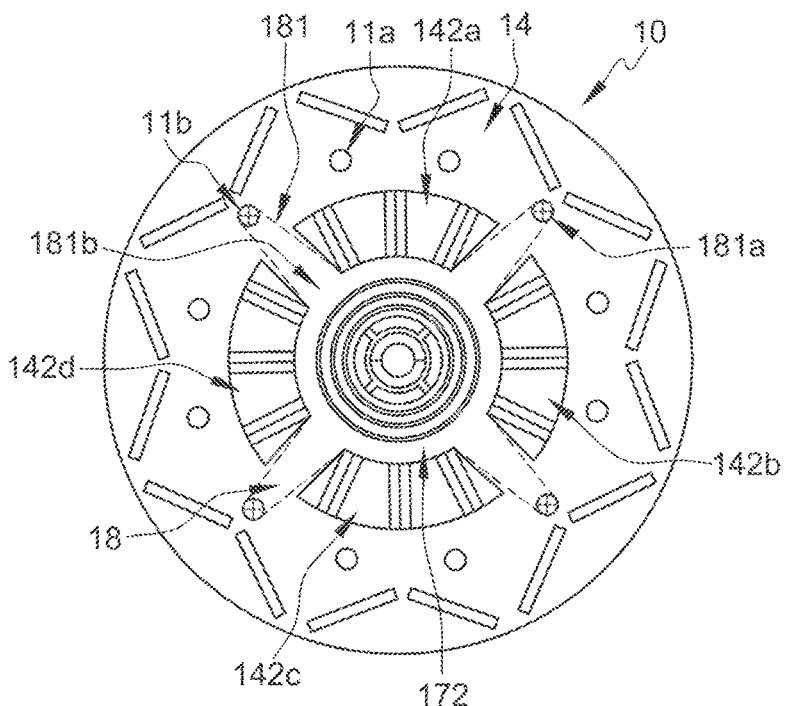
FIG. 15 is a rear axial view of the rotor according to FIG. 14, the rear flange having been removed.
Figure 16:
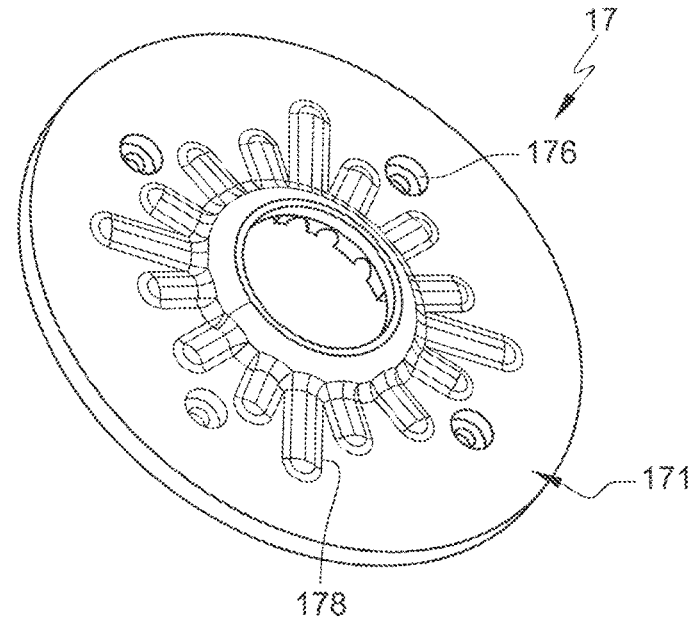
FIG. 16 is a perspective view of the external face of the front flange used in the rotor of FIG. 14.
Figure 17:
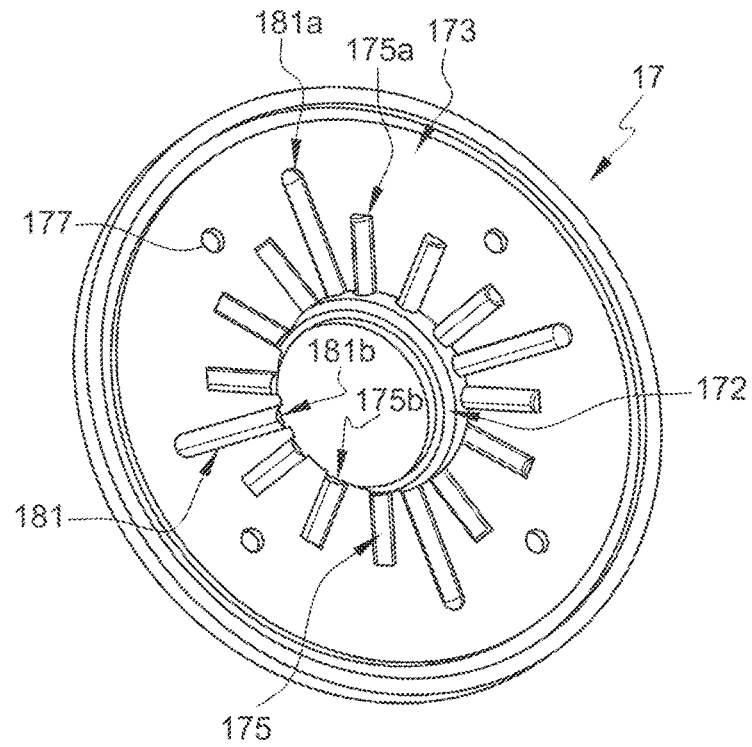
FIG. 17 is a perspective view of the internal face of the front flange of FIG. 16.

In particular, as illustrated in FIGS. 16 and 17, the front flange 17 fitted to the rotor 10 of FIG. 14 is shown. The rear flange 19 having a structure identical to the front flange 17, the technical details given below will similarly apply to the rear flange 19. The front flange 17 is substantially in the form of a disc comprising in particular an external face 171 and an internal face 173. The internal face 173 is in contact with the front lateral face 143 of the lamination stack 14 (the internal face 193 of the rear flange 19 is however in contact with the rear lateral face 144 of the lamination stack 14). Cavities 176 with hexagonal section are formed at the external face 171, each of said cavities 176 being adapted to house the head of a screw intended to connect the front and rear flanges 17, 19. In another variant, these cavities 176 may be omitted. Cavities with hexagonal section may also be formed on the rear flange 19 at its external face, each of said cavities being adapted to house a nut intended to cooperate with one of the screws to fasten the front and rear flanges 17, 19 on the lamination stack 14. Bores 177 are moreover formed through the front flange 17 to enable the passage of the threaded rods of the screws. In the mounted position of the flanges 17 and 19, these bores 17 are configured to face fastening holes 11$a$ of the lamination stack 14. These fastening holes 11$a$ are through holes so that it is possible to push a screw inside each hole 11$a$. As illustrated in FIG. 15, the lamination stack 14 is also provided with several other through holes 11$b$ which are not intended to house a fastening screw. The internal face 173 of the front flange 14 is further provided with a series of twelve oblong-shaped grooves 175 extending radially from a recessed central region 172 of said flange to an intermediate region of said flange, the twelve grooves 175 being disposed in four groups of three grooves 175, each group being separated by an oblong-shaped intermediate groove 181, said intermediate groove 181 extending radially from the central region 172 to a distal end 181$a$. The external face 171 therefore has a protrusion 178 conforming to the hollow shape of the underlying grooves 175 and 181.

As illustrated in FIG. 15, the lamination stack 14 comprises a plurality of second internal cavities 142 extending along a radial direction with respect to the axis X and are axially through. These second internal cavities 142 are configured to enable the circulation of a coolant inside the lamination stack. In the shown embodiment, the number of these second internal cavities 142 is four, namely the cavities 142$a$, 142$b$, 142$c$ and 142$d$. The cavities 142$a$-142$d$ each have a ring portion-shaped section and are uniformly distributed about the axis X. Two directly adjacent cavities 142$a$-142$d$ are separated by a radial segment 18 of the lamination stack 14 so that a central annular part of the body of the rotor consists of alternating second internal cavities 142$a$-142$d$ and radial segments 18. Each cavity 142$a$-142$d$ opens, at one of its ends, at the front lateral face 143 of said lamination stack 14, and, at another one of its ends, at the rear lateral face 144 of said lamination stack 14. Each of the front and rear lateral faces 143, 144 faces and is directly adjacent to an internal face 173, 193 respectively of the front and rear flanges 17, 19.

As illustrated in FIG. 17, each of the grooves 175 has a distal end 175$a$ and a proximal end 175$b$. In the mounted position of the front flange 17 shown in FIG. 14, the proximal end 175$b$ opens onto the central region 172 towards which the ends 125$a$ of the radial holes 125 of the shaft 12 also open and the distal end 175$a$ faces one of the second internal cavities 142$a$-142$d$ of the lamination stack 14. Thus, a fluid communication takes place between the radial holes 125 of the shaft 12 and the second internal cavities 142$a$-142$d$ via the grooves 175 of the front flange 17. Similarly, a fluid communication takes place between the radial holes 127 of the shaft 12 and the second internal cavities 142$a$-142$d$ via corresponding radial grooves formed at the internal face 193 of the rear flange 19.

Moreover, and as illustrated in FIGS. 15 and 17, each of the intermediate grooves 181 has a distal end 181$a$ and a proximal end 181$b$. In the mounted position of the front flange 17 shown in FIG. 14, the distal end 181$a$ and the proximal end 181$b$ are aligned with the radial segments 18 of the lamination stack 14, the proximal end 181$b$ opening onto the central region 172 towards which the ends 125$a$ of the radial holes 125 of the shaft 12 also open and the distal end 181$a$ facing one of the through holes 11$b$ of the lamination stack 14. Thus, a fluid communication takes place between the radial holes 125 of the shaft 12 and the through holes 11$b$ via intermediate grooves 181 of front flange 17. Similarly, a fluid communication takes place between the radial holes 127 of the shaft 12 and the through holes 11$b$ via corresponding intermediate grooves 181 formed at the internal face 193 of the rear flange 19. By convention, the intermediate grooves 181 formed in the front flange 17 are called "front intermediate channels" and the intermediate grooves 181 formed in the rear flange 19 are called "rear intermediate channels".

Thus, in this third embodiment, the coolant may circulate inside the lamination stack 14 not only through the internal cavities 142$a$-142$d$, but also through the through holes 11$b$, thus improving the removal of heat in the rotor compared to the first and second embodiments.

Of course, the invention is not limited to embodiments as previously described. In particular, in other embodiments (not shown) of the invention, the number of second internal cavities 142, of radial holes 125, 127, of through holes 11$b$ and of intermediate grooves 181 may differ from four, and the number of front and rear connecting channels 175, 195 may differ from four or twelve.

Thus, a possible configuration of the invention could consist of a rotor comprising only two second internal cavities 142 symmetrically disposed with respect to the axis X of the shaft 12.

In another possible configuration of the invention, the rotor may include three (or another odd number) second internal cavities 142, said second internal cavities 142 being regularly distributed about the axis X in order not to create unbalance for the rotor. In particular, the respective centers of gravity of the second internal cavities 142 may form an equilateral triangle in a plane perpendicular to the axis X and the center of gravity of this equilateral triangle will be aligned with the axis X.

In another possible configuration of the invention, the rotor 10 of FIG. 8 could include an insert 13 without separation fins 133. Therefore, the outlet channel 126 would not be divided into outlet channel segments 126$a$-126$d$, but would consist of a single peripheral cavity coaxially aligned with the central cavity 124 formed by the tubular part 131 of the insert 13.

The invention claimed is:

1. A rotor for an electric motor comprising:
   a rotor shaft rotatably mounted about an axis;
   a lamination stack coaxially mounted on the rotor shaft, the lamination stack comprising first internal cavities and at least two second internal cavities symmetrical with respect to the axis of the shaft and to each other, the at least two second internal cavities passing axially through the entire lamination stack so that they open, at one of their ends, at a front lateral face of the lamination stack and, at another one of their ends, at a rear lateral face of the lamination stack, the at least two second internal cavities being configured to enable the circulation of a coolant inside the lamination stack;
   a plurality of permanent magnets housed inside the first internal cavities of the lamination stack;
   a front flange and a rear flange coaxially mounted on the rotor shaft and axially arranged on either side of the lamination stack so as to be contiguous respectively to the front and rear lateral faces of the lamination stack;
   wherein the shaft is provided with at least one first internal channel for circulating a coolant, called the inlet channel, and with at least one second internal channel for circulating a coolant, called the outlet channel, and wherein the front flange, respectively the rear flange, is configured to form with the front lateral face, respectively the rear lateral face, of the lamination stack at least two front connecting channels, respectively at least two rear connecting channels, inside which a coolant can circulate, each of the at least two front connecting channels, respectively of the at least two rear connecting channels, being in fluid communication with one of the inlet and outlet channels and with one of the at least two second internal cavities;
   wherein the at least two rear connecting channels are in fluid communication with the inlet channel and the at least two front connecting channels are in fluid communication with the outlet channel, so that a coolant intended for the cooling of the rotor can circulate in the rotor successively through the inlet channel, then between the rear flange and the rear lateral face of the lamination stack through the at least two rear connecting channels, then inside the lamination stack through the at least two second internal cavities, then between the front flange and the front lateral face through the at least two front connecting channels, and finally through the outlet channel; and
   wherein the shaft comprises a hollow front end portion and a solid rear end portion separated from the front end portion by a hollow central portion, the front end portion and the central portion being crossed by a cylindrical-shaped central cavity, the central cavity forming the inlet channel of the shaft, the front end portion further having at least one peripheral cavity formed within the front end portion of the shaft and coaxially aligned with the central cavity, the at least one peripheral cavity forming the outlet channel of the shaft, and
   wherein at least two holes radially oriented with respect to the axis of the shaft are formed inside the front end portion, respectively the central portion, so as to open, on one side, into the outlet channel, respectively the inlet channel, and, on the other side, into the at least two front connecting channels, respectively the at least two rear connecting channels.

2. The rotor according to claim 1, wherein the at least two front connecting channels are in fluid communication with the inlet channel and the at least two rear connecting channels are in fluid communication with the outlet channel, so that a coolant intended for the cooling of the rotor can circulate in the rotor successively through the inlet channel, then between the front flange and the front lateral face of the lamination stack through the at least two front connecting channels, then inside the lamination stack through the at least two second internal cavities, then between the rear flange and the rear lateral face of the lamination stack through the at least two rear connecting channels, and finally through the outlet channel.

3. The rotor according to claim 2, wherein the shaft comprises a hollow front end portion and a hollow rear end portion separated from the front end portion by a solid central portion, the front end portion, respectively the rear end portion, being crossed by a cylindrical-shaped central cavity, the central cavity forming the inlet channel, respectively the outlet channel, of the shaft, and wherein at least two holes radially oriented with respect to the axis of the shaft are formed inside the front end portion, respectively of the rear end portion, so as to open, on one side, into the inlet channel, respectively the outlet channel, and, on the other side, into the at least two front connecting channels, respectively the at least two rear connecting channels.

4. The rotor according to claim 3, wherein each of the front and rear flanges has an internal face in contact with a lateral face of the lamination stack, the internal face being provided with at least two oblong-shaped grooves extending radially from a recessed central region of the flange, at which the grooves are in fluid communication with the inlet or outlet channel of the shaft, to an intermediate region of the flange facing one of the at least two second internal cavities of the lamination stack.

5. The rotor according to claim 2, wherein each of the front and rear flanges has an internal face in contact with a lateral face of the lamination stack, the internal face being provided with at least two oblong-shaped grooves extending radially from a recessed central region of the flange, at which the grooves are in fluid communication with the inlet or outlet channel of the shaft, to an intermediate region of the flange facing one of the at least two second internal cavities of the lamination stack.

6. The rotor according to claim 1, wherein the shaft comprises a main body provided with a blind hole aligned along the axis of the shaft, the blind hole comprising two contiguous sections with different internal diameters, namely a first section having a first internal diameter and a second section having a second internal diameter, and wherein an insert made of plastic material is housed inside the blind hole at the first section, the insert being formed of a tubular part aligned with the second section of the blind hole and having an internal diameter which is substantially equal to the second internal diameter, and of an annular part extending radially about one of the ends of the tubular part, the annular part being positioned at the interface between the first section and the second section of the blind hole and having an external diameter which is substantially equal to the first internal diameter, the inlet channel of the shaft being jointly defined by the tubular part of the insert and by the second section of the blind hole and the outlet channel of the shaft corresponding to the space delimited by the first section of the blind hole and by the tubular and annular parts of the insert.

7. The rotor according to claim 6, wherein the insert comprises one or several separation fins extending radially from the external periphery of the tubular part, each of the separation fins being configured to separate the outlet channel into two or several segments of outlet channels.

8. The rotor according to claim 7, wherein each of the front and rear flanges has an internal face in contact with a lateral face of the lamination stack, the internal face being provided with at least two oblong-shaped grooves extending radially from a recessed central region of the flange, at which the grooves are in fluid communication with the inlet or outlet channel of the shaft, to an intermediate region of the flange facing one of the at least two second internal cavities of the lamination stack.

9. The rotor according to claim 8, wherein each of the radial grooves faces a radial hole formed through the shaft, the radial hole opening, on one side, onto the inlet or outlet channel of the shaft and, on the other side, onto the peripheral wall of the shaft.

10. The rotor according to claim 9, wherein each of the front and rear flanges is provided on its internal face with a circular groove intended to house a ring-shaped gasket, the gasket being intended to provide sealing between the flange and the lamination stack.

11. The rotor according to claim 10, wherein the front flange, respectively the rear flange, is configured to form with the front lateral face, respectively the rear lateral face, of the lamination stack several groups of front connecting channels, respectively several groups of rear connecting channels, each of the groups including at least two front connecting channels, respectively at least two rear connecting channels, inside which a coolant can circulate, each of the at least two front connecting channels, respectively of the at least two rear connecting channels, being in fluid communication with one of the inlet and outlet channels and with one of the at least two second internal cavities.

12. The rotor according to claim 11, wherein the front flange, respectively the rear flange, is configured to form with the front lateral face, respectively the rear lateral face, of the lamination stack several front intermediate channels, respectively several rear intermediate channels, inside which a coolant can circulate, each of the front intermediate channels, respectively of the rear intermediate channels, being axially aligned with a radial segment of the lamination stack separating two adjacent second internal cavities, each of the front, respectively rear, intermediate channels being in fluid communication with one of the inlet and outlet channels and with a through hole formed through the lamination stack, the through hole possibly receiving a fastening screw intended to fasten the front and rear flanges on the lamination stack.

13. The rotor according to claim 1, wherein each of the front and rear flanges has an internal face in contact with a lateral face of the lamination stack, the internal face being provided with at least two oblong-shaped grooves extending radially from a recessed central region of the flange, at which the grooves are in fluid communication with the inlet or outlet channel of the shaft, to an intermediate region of the flange facing one of the at least two second internal cavities of the lamination stack.

14. The rotor according to claim 13, wherein each of the radial grooves faces a radial hole formed through the shaft, the radial hole opening, on one side, onto the inlet or outlet channel of the shaft and, on the other side, onto the peripheral wall of the shaft.

15. The rotor according to claim 1, wherein each of the front and rear flanges is provided on its internal face with a circular groove intended to house a ring-shaped gasket, the gasket being intended to provide sealing between the flange and the lamination stack.

16. The rotor according to claim 1, wherein the front flange, respectively the rear flange, is configured to form with the front lateral face, respectively the rear lateral face, of the lamination stack several groups of front connecting channels, respectively several groups of rear connecting channels, each of the groups including at least two front connecting channels, respectively at least two rear connecting channels, inside which a coolant can circulate, each of the at least two front connecting channels, respectively of the at least two rear connecting channels, being in fluid communication with one of the inlet and outlet channels and with one of the at least two second internal cavities.

17. The rotor according to claim 16, wherein the front flange, respectively the rear flange, is configured to form with the front lateral face, respectively the rear lateral face, of the lamination stack several front intermediate channels, respectively several rear intermediate channels, inside which a coolant can circulate, each of the front intermediate channels, respectively of the rear intermediate channels, being axially aligned with a radial segment of the lamination stack separating two adjacent second internal cavities, each of the front, respectively rear, intermediate channels being in fluid communication with one of the inlet and outlet channels and with a through hole formed through the lamination stack, the through hole possibly receiving a fastening screw intended to fasten the front and rear flanges on the lamination stack.

18. An electric motor comprising a rotor according to claim 1.

* * * * *